(12) United States Patent
Konireddygari et al.

(10) Patent No.: US 8,250,273 B2
(45) Date of Patent: Aug. 21, 2012

(54) SECURE HANDLING AND ROUTING OF MESSAGE-SIGNALED INTERRUPTS

(75) Inventors: Sreekanth Konireddygari, Durham, NC (US); Sandra Rhodes, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 12/559,002

(22) Filed: Sep. 14, 2009

(65) Prior Publication Data
US 2011/0066783 A1 Mar. 17, 2011

(51) Int. Cl.
*G06F 9/48* (2006.01)
(52) U.S. Cl. .......................... 710/269; 710/262; 713/168
(58) Field of Classification Search .......... 713/150–181; 710/260–269
See application file for complete search history.

(56) References Cited

U.S. PATENT DOCUMENTS

| | | | |
|---|---|---|---|
| 5,892,900 A | 4/1999 | Ginter et al. | |
| 6,704,871 B1 | 3/2004 | Kaplan et al. | |
| 6,708,273 B1 | 3/2004 | Ober et al. | |
| 2003/0229794 A1* | 12/2003 | Sutton et al. | 713/189 |

OTHER PUBLICATIONS

Chaudhuri, Mainak, et al. "SMTp: An Architecture for Next-generation Scalable Multi-threading", Computer Society, Proceeedings of the 31st Annual International Symposium on Computer Architecture, 2004, 12 pages.

Chaitanya-et al.; "Design, Implementation and Evaluation of Security in iSCSI-based Network Storage Systems"; ACM Digital Library; Oct. 30, 2006.

Dewan-et al.; "A Hypervison-Based System for Protecting Software Runtime Memory and Persistent Storage"; ACM Digital Library; 2008.

IBM—"PCI-Express Hot-Plug Event Tri-Modal Interrupt Escalation"; IP.COM/IBM TDB; Sep. 17, 2003.

* cited by examiner

*Primary Examiner* — Glenn A Auve
(74) *Attorney, Agent, or Firm* — Thomas Tyson; Jeffrey L. Streets

(57) ABSTRACT

Encryption of interrupt vectors and authentication of device drivers prevents unauthorized modules from interfering with an interrupt handler. An operating system may encrypt an interrupt vector for a PCI device, initializing a Local Interrupt Controller of a CPU with the key to enable decryption of the interrupt vector, initializing a redirection table on an I/O Interrupt Controller of the CPU with the encrypted interrupt vector, and initializing the PCI device with an encrypted MSI vector for subsequent use in an interrupt request. The PCI device may raise an interrupt that can only be decrypted by the Local Interrupt Controller and used be used by the processor to handle the interrupt. The operating system may also authenticate a driver before executing a request to register, deregister or change an interrupt handler. An authentication code is sent from the OS to the device driver for use in any request. The request is executed only if the operating system determines that the authentication code in the request matches the authentication code stored by the operating system for that device driver.

21 Claims, 5 Drawing Sheets

SECURE HANDLING AND ROUTING OF MESSAGE-SIGNALED INTERRUPTS

BACKGROUND

1. Field of the Invention

The present invention relates to methods for secure handling and routing of interrupts in a computer system.

2. Background of the Related Art

In a computer, an interrupt is a signal indicating the need for attention. An interrupt causes the processor to save its state of execution and begin execution of an interrupt handler, which may also be referred to as an interrupt service routing. Although some communication standards utilize a physical interrupt line from a device to the processor, a device compatible with the peripheral component interconnect (PCI) standard raises a message-signaled interrupt (MSI) that does not use a physical interrupt line. Instead, a message-signaled interrupt allows a device to signal its request for service by sending a short message over some communication medium, for example by writing the message onto the PCI bus. Because the identity of the interrupt is indicated by a pattern of data bits, not requiring a separate physical conductor, many more distinct interrupts can be efficiently handled.

A message-signaled interrupt vector provides an index into an interrupt descriptor table maintained by, and accessible to, the processor so that the processor can identify the address of the interrupt handler that needs to be executed. These MSI vectors, as dictated by the current PCI specification, are initialized and stored in the PCI configuration space within a PCI device so the PCI device can request service by executing a memory-write of the MSI vector to a known destination address. This MSI vector information is then forwarded by the input/output advanced programmable interrupt controller (I/O Interrupt Controller) in the form of a message on the front-side bus to the local advanced programmable interrupt controller (Local Interrupt Controller) associated with a particular processor.

BRIEF SUMMARY

One embodiment of the present invention provides a method for secure handling and routing of interrupts. The method comprises an OS using a key to encrypt an interrupt vector for a PCI device, initializing a Local Interrupt Controller of a CPU with the key to enable decryption of the interrupt vector, initializing a redirection table on an I/O Interrupt Controller of the CPU with the encrypted interrupt vector, wherein the redirection table stores the encrypted interrupt vector in association with an identifier for a destination CPU, and initializing the PCI device with an encrypted MSI vector for subsequent use in an interrupt request.

Another embodiment of the method further comprises the PCI device raising an interrupt by sending the encrypted MSI vector to the I/O Interrupt Controller, and the I/O Interrupt Controller redirecting the encrypted MSI vector to the Local Interrupt Controller. Then, the Local Interrupt Controller decrypts the encrypted MSI vector so that the CPU can use the decrypted interrupt vector as an index into an interrupt descriptor table, retrieve the interrupt service routine address, and execute the interrupt service routine located at the interrupt service routine address.

Yet another embodiment of the present invention provides a method for authenticating a device driver. The method may be performed by a computer system that may or may not also be performing the foregoing method for handling encrypted interrupts. The method for authenticating a device driver comprises the OS storing an authentication code in association with an identification code for a device driver, and the OS sharing the authentication code with the device driver. During operation of the computer system, the device driver may call an interface of the OS to request registration or change of an interrupt handler, wherein the registration or change request includes an encrypted interrupt vector, an interrupt handler address, and the authentication code. When the OS receives the registration or change request from the device driver, the OS allows the requested registration or change only in response to determining that the authentication code in the request matches the authentication code previously stored by the operating system in association with the identification code for the device driver.

DETAILED DESCRIPTION

Figure 1:
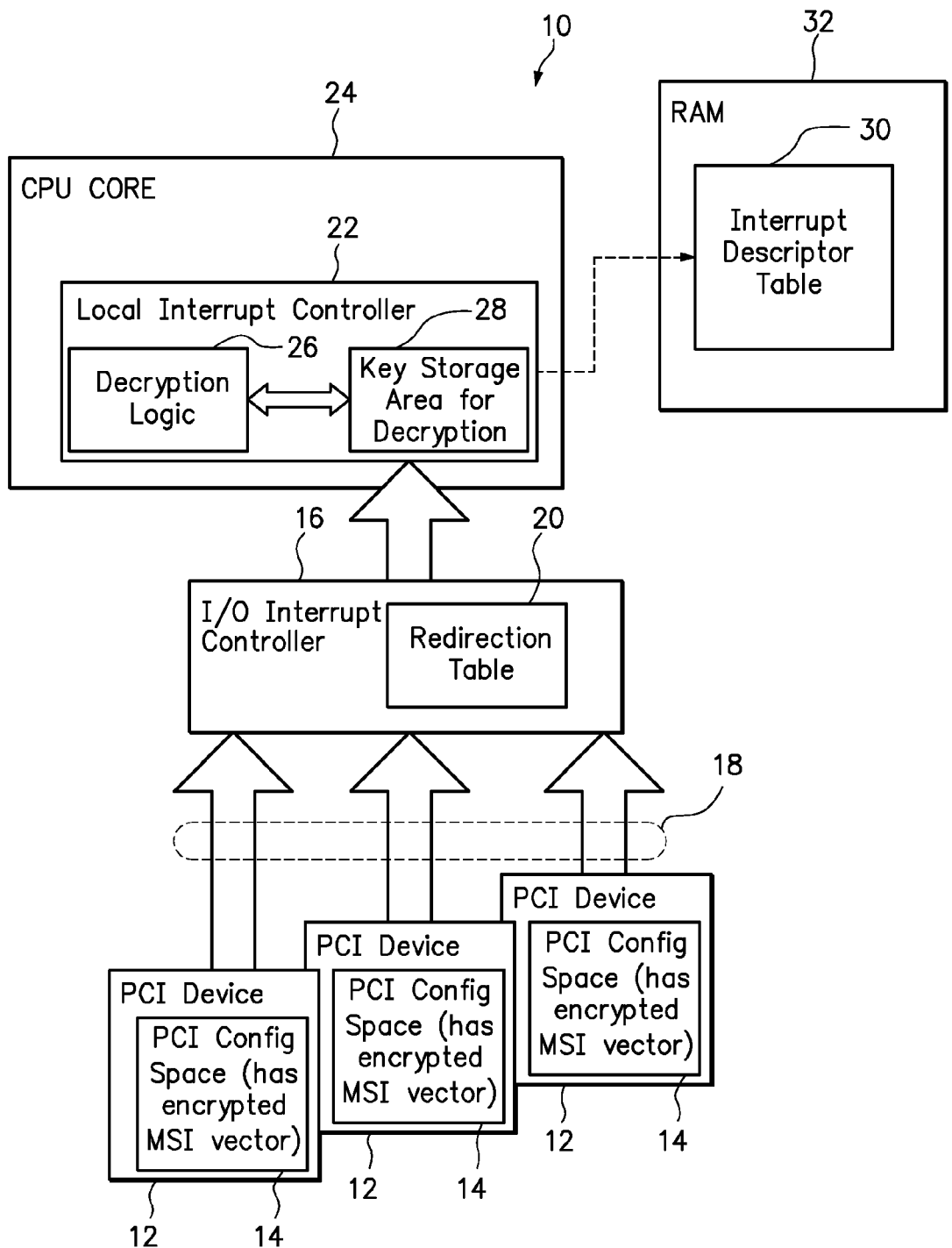
FIG. 1 is a diagram of a system for handling encrypted interrupt vectors.

One embodiment of the present invention provides a method for secure handling and routing of interrupts. The method comprises an OS using a key to encrypt an interrupt vector for a PCI device, initializing a Local Interrupt Controller of a CPU with the key to enable decryption of the interrupt vector, initializing a redirection table on an I/O Interrupt Controller of the CPU with the encrypted interrupt vector, wherein the redirection table stores the encrypted interrupt vector in association with an identifier for a destination CPU, and initializing the PCI device with an encrypted MSI vector for subsequent use in an interrupt request. The PCI device preferably stores the encrypted MSI vector in PCI configuration space.

Optionally, the encryption key used by the operating system to encrypt the interrupt vector may be dynamically generated using an algorithm that utilizes system boot time, vital product data (VPD), or both as inputs. VPD in this embodiment refers to information about hardware and firmware installed on the system, for example BIOS version, ethernet MAC address, and serial number of the system and onboard controllers. Using boot time as an input to the key generation will cause the dynamically generated key to be different every time the operating system boots. Using VPD as an input to the key generation will cause the dynamically generated key to be unique among two different systems, for example even among two systems that differ only by the type, model or manufacturer of a single system component such as a hard drive. Alternatively, the encryption key may be preconfigured in the operating system or input by the user during boot time. Encryption methods such as SHA-1 can be used to encrypt the vectors.

Similarly, the interrupt vector may be encrypted using a hash function that produces an encrypted interrupt vector in the form of a message digest. The use of hash functions is well known and prevents detection of the interrupt vector. Optionally, the hash function may include system boot time and/or vital product data in order to provide a unique message digest after each system boot and across systems with different components.

After encrypting the interrupt vectors, the OS will also initialize the Local Interrupt Controller of the CPU(s) with the message digest/key during boot time before the interrupts are enabled. The Local Interrupt Controller preferably stores the key in a write-once, read-disable register. Upon receiving an encrypted interrupt from the I/O Interrupt Controller, the Local Interrupt Controller uses the key to decrypt the interrupt vector. The OS implements logic that is required to initialize the message digest/key and for decryption of the interrupt vectors by the Local Interrupt Controller. The OS will also initialize the redirection table on the I/O Interrupt Controller with the encrypted vectors so that the vector information it forwards to the Local Interrupt Controller is encrypted. Since the device drivers are not required to know the "real" vectors, they can use the encrypted vectors to register the interrupt handlers.

The I/O Interrupt Controller includes an entry register for each of a plurality of PCI devices, as well as a redirection table, such as a set of programmable registers, for use in forwarding interrupts to the processors. After the I/O Interrupt Controller receives an encrypted interrupt vector at one of its entry registers, the I/O Interrupt Controller searches the redirection table for an entry having the same encrypted interrupt vector and redirects the encrypted interrupt vector to the destination processor designated in the redirection table.

The PCI device is initialized by the OS providing the encrypted MSI vector to the configuration space on the PCI device. The PCI device may subsequently use the encrypted MSI vector to raise an interrupt with a write transaction on the PCI bus. The write transaction is forwarded to the I/O Interrupt Controller, which redirects the encrypted MSI vector to the destination processor indicated in the redirection table.

Another embodiment of the method further comprises the PCI device raising an interrupt by sending the encrypted MSI vector to the I/O Interrupt Controller, and the I/O Interrupt Controller redirecting the encrypted MSI vector to the Local Interrupt Controller of a destination CPU. Then, the Local Interrupt Controller decrypts the encrypted MSI vector so that the CPU can use the decrypted interrupt vector as an index into an interrupt descriptor table, retrieve the interrupt service routine address, and execute the interrupt service routine located at the interrupt service routine address. Because the Local Interrupt Controller has been initialized with the encryption key/message digest, the Local Interrupt Controller is able to decrypt the encrypted vector information received from the PCI device and extract the "real" vector. However, an unauthorized device driver or agent will be deterred from hijacking the interrupt handler since the interrupt vector transferred within each request for service is encrypted.

An interrupt vector is an index into the interrupt descriptor table which contains addresses of interrupt handlers. Current CPUs are pre-programmed to fetch the address of the interrupt handler based on the interrupt vector that arrives at the interrupt pins of Local Interrupt Controller. By encrypting the interrupt vector, the present invention hides the relationship between the vector and the associated interrupt handler (address) to eliminate or thwart hijacking of interrupt handlers. For example, if a spyware was able to determine that interrupt vector 0x10 is used for the ethernet card, and if the same spyware would want to operate in stealth mode whenever the ethernet card interrupts the CPU, it could transfer control to itself by overwriting the address of the interrupt handler that resides at index 0x10 in the interrupt descriptor table. If this vector is encrypted according to the present invention (for example, the encrypted value of the interrupt vector 0x10h is "0x671afdf789dfaacb"), it would be impossible to determine the association between the vector and its interrupt handler address in the interrupt descriptor table. Since the CPU is the only entity that has the key to decrypt the vector information, it is still able to retrieve the address of the interrupt service handler from the interrupt descriptor table.

Yet another embodiment of the present invention provides a method for authenticating a device driver. A device driver is responsible for registering interrupt handlers with the OS for the device that the driver controls. Registration, change or update of an interrupt handler is accomplished through an interface provided by the OS. Registration of interrupt handlers by the device drivers typically happens either while the OS is booting or when a new device is plugged into the computer system.

The method for authenticating a device driver comprises the OS storing an authentication code in association with an identification code for a device driver, and the OS sharing the authentication code with the device driver. Optionally, the authentication code may be a random number generated by the OS. If multiple device drivers are being used, the OS preferably provides each device driver with a different authentication code. The OS preferably provides the authentication code to the device driver as the driver is being loaded either during system boot time or when a new device is installed.

During operation of the computer system, the device driver may call an interface of the OS to request registration or change of an interrupt handler, wherein the registration or change request includes an encrypted interrupt vector, the address of the interrupt handler being registered or changed, and the authentication code. For example, a registration request may be provided using the following command: int register_handler(int vector, handler*isr_address, key_type key). The interface provided by the OS to register interrupt handlers will receive the request and the OS will authenticate only those alleged device drivers that provide a request having an authentication code that matches an authentication code stored in an authentication module. Any unauthorized module or agent will not be able to override any interrupt handler that is already registered because the module will not have access to the authentication code. It should be recognized that the method of authenticating a device driver may be performed by a computer system that may or may not also be performing the foregoing method for handling encrypted interrupts.

In the method of authenticating a device driver, the OS will preferably also require authentication of a device driver before executing a request to de-register or change an interrupt handler. Accordingly, the method may further comprise the device driver calling a device driver registration interface of the operating system to request deregistration of the interrupt handler, wherein the deregistration request includes an interrupt vector, an interrupt handler address, and the authentication code. When the operating system receives the deregistration request from the device driver, the OS allows the requested deregistration of the interrupt handler only in response to determining that the authentication code in the deregistration request matches the authentication code stored by the operating system in association with the identification code for the device driver.

FIG. 1 is a diagram of a system 10 for handling encrypted interrupt vectors. A plurality of PCI devices 12 each has a PCI configuration space 14 that stores an encrypted MSI vector. Each PCI device 12 is in communication with the I/O Interrupt Controller 16 over a PCI bus 18. The redirection table 20 is maintained by the I/O Interrupt Controller 16 for directing interrupt vectors from any of the PCI devices to a Local Interrupt Controller 22 that is associated with an identified destination processor 24. The Local Interrupt Controller 22 includes decryption logic 26 and key storage 28 that enable the Local Interrupt Controller to decrypt an encrypted interrupt vector. The interrupt vector obtained in this manner is used as an index into the interrupt descriptor table 30 that is stored in memory 32.

Figure 2:
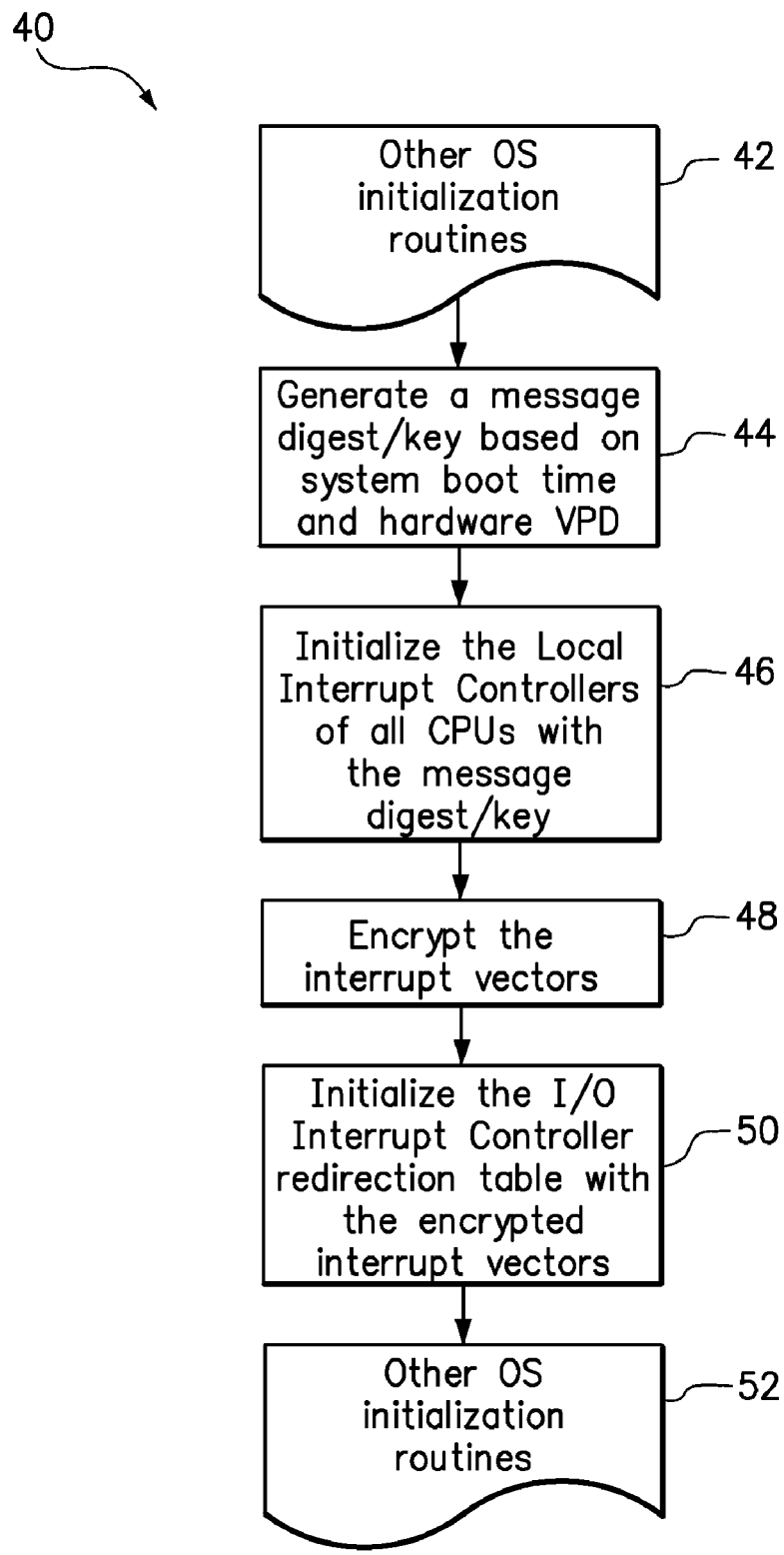
FIG. 2 is a flowchart of a method for initializing a system for handling encrypted interrupt vectors.

FIG. 2 is a flowchart of a method 40 to initialize a computer system for handling encrypted interrupt vectors. After the OS has performed other initialization routines in step 42, a message digest or key is generated in step 44, for example based upon the system boot time and hardware vital product data. In step 46, the OS initializes the Local Interrupt Controller of each processor in the system with the message digest or key. Then, the message digest or key is used to encrypt the interrupt vectors in step 48, before initializing the redirection table in the I/O Interrupt Controller with the encrypted interrupt vectors in step 50. In step 52, the OS executes other initialization routines, including the initialization of the PCI configuration space in each PCI device with the encrypted interrupt vectors.

Figure 3:
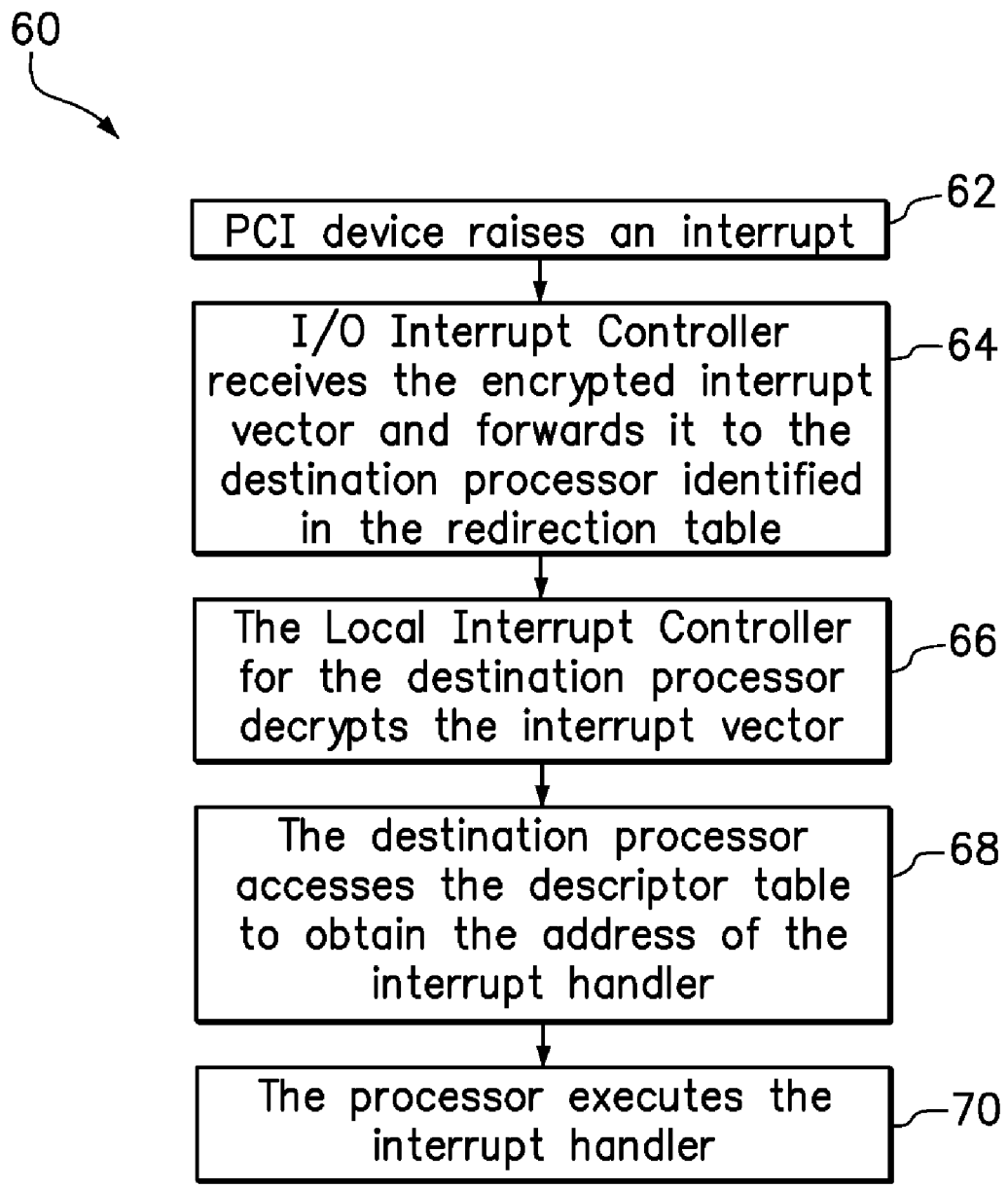
FIG. 3 is a flowchart of a method for handling an encrypted interrupt vector.

FIG. 3 is a flowchart of a method 60 for handling an encrypted interrupt vector in a computer system that has already been initialized. An interrupt is raised by a PCI device in step 62. In step 64, the I/O Interrupt Controller receives the encrypted interrupt vector and forwards it to the destination processor identified in the redirection table. The Local Interrupt Controller for the destination processor decrypts the interrupt vector in step 66 so that the destination processor may access the descriptor table to obtain the address of the interrupt handler in step 68. Finally, the processor executes the interrupt handler in step 70.

The forgoing methods avoid the use of the interrupt vector in a "raw" manner in order to prevent a potential security risk. The encryption of the MSI vector makes it difficult to determine the association between a PCI device and its MSI vector. Accordingly, the method prevents an unauthorized agent with ring-0 (kernel-mode) privileges from determining this association, such that the agent is unable to modify one or more entries in the interrupt descriptor table for the purpose of hijacking the interrupt service routines.

Figure 4:
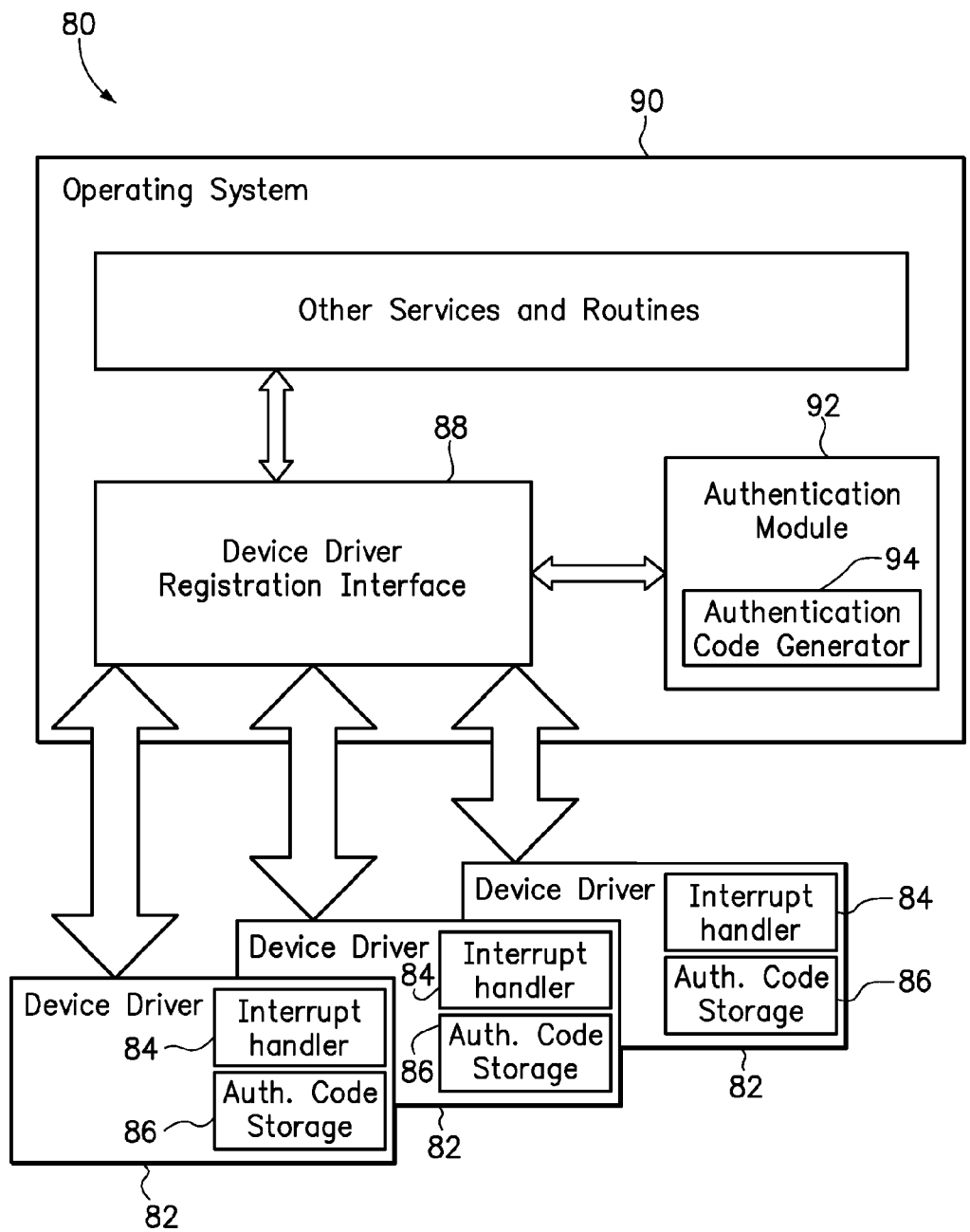
FIG. 4 is a diagram of a system for authenticating a device driver.

FIG. 4 is a diagram of a system 80 for authenticating a device driver. One or more device drivers 82 are implemented to support an equal number of devices. Each device driver 82 includes an interrupt handler 84 and storage 86 for an authentication code. The device drivers 82 send requests for registration, de-registration or change of an interrupt handler to a device driver registration interface 88 that is part of the operating system 90. The interface 88 communicates with an authentication module 92 that includes the authentication code generator 94 and logic to verify that registration requests received at the interface 88 includes an authentication code that matches the authentication code generated and stored by the authentication module 92. Only requests that include a proper authentication code are allowed to register, deregister or change an interrupt handler.

Unauthorized kernel-mode modules that are designed to operate in stealth mode by hijacking the interrupt handlers are not able to take advantage the device driver registration interface to manipulate the interrupt handlers that are already registered in accordance with the present invention. The security features of this invention may be built into the operating system to authenticate a device driver that is calling the OS interface to register, deregister or change an interrupt handler.

Figure 5:
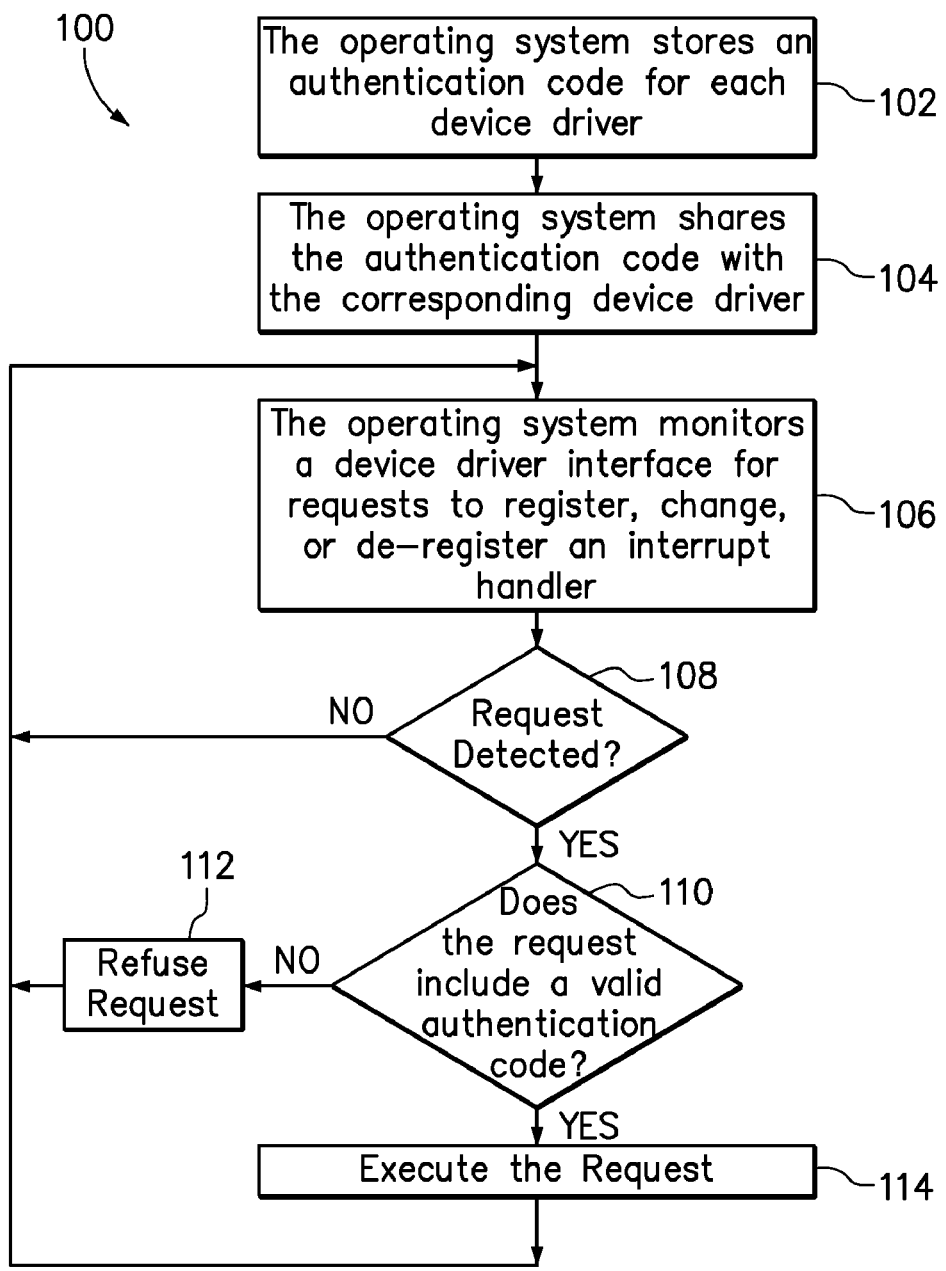
FIG. 5 is a flowchart of a method for authenticating a device driver.

FIG. 5 is a flowchart of a method 100 for authenticating a device driver. In step 102, the operating system stores an authentication code for each device driver. In step 104, the operating system shares the authentication code with the corresponding device driver. Each device driver in the system stores its authentication code for subsequent communications with the operation system. Optionally, steps 102 and 104 may occur during system setup and/or require user confirmation that the device driver is legitimate.

In step 106, the operating system monitors a device driver interface for requests to register, change, or de-register an interrupt handler. If such a request is detected in step 108, then the request is inspected to determine whether the request includes a valid authentication code in step 110. In the authentication code is valid (i.e., the authentication code in the request matches an authentication code stored by the operating system in step 102), then in the request is executed by the operating system in step 114. However, if the authentication code in not valid, then the request is refused in step 112. If no request is detected in step 108, a request contains an invalid authentication code in step 110, or the request has been executed in step 114, then the process returns to step 106 to monitor for any additional requests.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible storage medium having computer-usable program code stored on the storage medium. In one non-limiting example, the computer program product may be implemented in an operating system.

Any combination of one or more computer usable or computer readable storage medium(s) may be utilized. The computer-usable or computer-readable storage medium may be, for example but not limited to, an electronic, magnetic, electromagnetic, or semiconductor apparatus or device. More specific examples (a non-exhaustive list) of the computer-readable medium include: a portable computer diskette, a hard disk, random access memory (RAM), read-only memory (ROM), an erasable programmable read-only memory (EPROM or Flash memory), a portable compact disc read-only memory (CD-ROM), an optical storage device, or a magnetic storage device. The computer-usable or computer-readable storage medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer-usable or computer-readable storage medium may be any storage medium that can contain or store the program for use by a computer. Computer usable program code contained on the computer-usable storage medium may be communicated by a propagated data signal, either in baseband or as part of a carrier wave. The computer usable program code may be transmitted from one storage medium to another storage medium using any appropriate transmission medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
an operating system using a key to encrypt an interrupt vector for a PCI device;
initializing a Local Interrupt Controller of a CPU with the key to enable decryption of the interrupt vector;
initializing a redirection table on an I/O Interrupt Controller of the CPU with the encrypted interrupt vector, wherein the redirection table stores the encrypted interrupt vector in association with an identifier for a destination CPU; and
initializing the PCI device with an encrypted MSI vector for subsequent use in an interrupt request.

2. The method of claim 1, wherein the PCI device stores the encrypted MSI vector in PCI configuration space.

3. The method of claim 1, wherein the interrupt vector is encrypted using an algorithm that is based on system boot time and vital product data (VPD) of the PCI device.

4. The method of claim 1, wherein the interrupt vector is encrypted using a hash function and the encrypted interrupt vector is in the form of a message digest.

5. The method of claim 1, further comprising:
the PCI device raising an interrupt by sending the encrypted MSI vector to the I/O Interrupt Controller;
the I/O Interrupt Controller redirecting the encrypted MSI vector to the Local Interrupt Controller;
the Local Interrupt Controller decrypting the encrypted MSI vector;
the CPU using the decrypted interrupt vector as an index into an interrupt descriptor table to retrieve an interrupt service routine address; and
the CPU executing an interrupt service routine located at the interrupt service routine address.

6. The method of claim 5, wherein the step of the PCI device raising an interrupt includes the PCI device writing the encrypted MSI vector onto a PCI bus.

7. The method of claim 1, wherein the I/O Interrupt Controller routes the encrypted MSI vector to the Local Interrupt Controller according to the encrypted interrupt vector stored in the I/O Interrupt Controller redirection table.

8. The method of claim 1, further comprising:
the operating system storing an authentication code in association with an identification code for a device driver; and
the operating system sharing the authentication code with the device driver.

9. The method of claim 8, further comprising:
the device driver calling an interface of the operating system to request registration or change of an interrupt handler, wherein the registration or change request includes an encrypted interrupt vector, an interrupt handler address, and the authentication code; and
the operating system receiving the registration or change request from the device driver and allowing the requested registration or change only in response to determining that the authentication code in the request matches the authentication code stored by the operating system in association with the identification code for the device driver.

10. The method of claim 9, wherein the device driver requests registration of the interrupt handler while the operating system is booting.

11. The method of claim 9, wherein the device driver requests registration of the interrupt handler in response to detecting that a new device has been plugged into a computer system.

12. The method of claim 8, further comprising:
the operating system generating the authentication code.

13. The method of claim 12, wherein the authentication code is a random number.

14. The method of claim 8, wherein the operating system stores a unique authentication code for each of a plurality of device drivers in a computer system.

15. The method of claim 8, further comprising:
the device driver calling a device driver registration interface of the operating system to request deregistration of the interrupt handler, wherein the deregistration request includes an interrupt vector, an interrupt handler address, and the authentication code; and
the operating system receiving the deregistration request from the device driver and allowing the requested deregistration of the interrupt handler only in response to determining that the authentication code in the deregistration request matches the authentication code stored by the operating system in association with the identification code for the device driver.

16. A computer program product including computer usable program code embodied on a computer usable storage medium for protecting an interrupt vector, the computer program product comprising:
computer usable program code for using a key to encrypt an interrupt vector for a PCI device;
computer usable program code for initializing a Local Interrupt Controller of a CPU with the key to enable decryption of the interrupt vector;
computer usable program code for initializing a redirection table on an I/O Interrupt Controller of the CPU with the encrypted interrupt vector, wherein the redirection table stores the encrypted interrupt vector in association with an identifier for a destination CPU; and
computer usable program code for initializing the PCI device with an encrypted MSI vector for subsequent use in an interrupt request.

17. The computer program product of claim 16, further comprising:
computer usable program code for causing the Local Interrupt Controller to decrypt the encrypted MSI vector in response to receiving an interrupt raised by the PCI device;
computer usable program code for using the decrypted interrupt vector as an index into an interrupt descriptor table to retrieve an interrupt service routine address; and
computer usable program code for executing an interrupt service routine located at the interrupt service routine address.

18. The computer program product of claim 16, further comprising:
computer usable program code for storing an authentication code in association with an identification code for a device driver; and
computer usable program code for sharing the authentication code with the device driver.

19. The computer program product of claim 18, further comprising:
computer usable program code for receiving a registration or change request from the device driver and allowing the requested registration or change only in response to determining that registration or change request includes an authentication code that matches the authentication code stored by the operating system in association with the identification code for the device driver.

20. The computer program product of claim 18, wherein the operating system stores a unique authentication code for each of a plurality of device drivers in a computer system.

21. The computer program product of claim 18, further comprising:
computer usable program code for receiving a deregistration request from the device driver and allowing the requested deregistration of the interrupt handler only in response to determining that the deregistration request includes an authentication code that matches the authentication code stored by the operating system in association with the identification code for the device driver.

* * * * *